(12) United States Patent
Goto et al.

(10) Patent No.: US 8,787,891 B2
(45) Date of Patent: Jul. 22, 2014

(54) BASE STATION APPARATUS, TERMINAL APPARATUS, AND COMMUNICATION METHOD

(75) Inventors: Kuniyasu Goto, Kawasaki (JP); Takanori Tanaka, Kawasaki (JP); Ryoji Honda, Kawasaki (JP); Kazuyasu Yamamoto, Kawasaki (JP); Akihiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 460 days.

(21) Appl. No.: 12/659,269

(22) Filed: Mar. 2, 2010

(65) Prior Publication Data

US 2010/0226321 A1 Sep. 9, 2010

(30) Foreign Application Priority Data

Mar. 4, 2009 (JP) .................. 2009-050864

(51) Int. Cl.
*H04W 52/02* (2009.01)
(52) U.S. Cl.
USPC ........... 455/418; 455/419; 455/420; 455/561; 713/320; 713/321; 713/323; 713/324
(58) Field of Classification Search
USPC .................. 455/418–420, 561; 713/320–324
See application file for complete search history.

(56) References Cited

U.S. PATENT DOCUMENTS

| 2005/0219120 | A1 | 10/2005 | Chang | |
| 2009/0037556 | A1* | 2/2009 | Kokkinen et al. | 709/217 |
| 2009/0063878 | A1* | 3/2009 | Schmidt et al. | 713/310 |
| 2009/0119766 | A1* | 5/2009 | Huetter et al. | 726/12 |
| 2010/0169677 | A1* | 7/2010 | Madhusoodanan | 713/310 |

FOREIGN PATENT DOCUMENTS

| JP | 9-107325 | 4/1997 |
| JP | 11-252664 | 9/1999 |
| JP | 3091392 | 10/2002 |
| JP | 2003-339082 | 11/2003 |
| JP | 2004-186738 | 7/2004 |
| JP | 2005-12973 | 1/2005 |
| JP | 2005-18377 | 1/2005 |
| JP | 2006-339795 | 12/2006 |
| JP | 2007-258901 | 10/2007 |
| WO | 2004/003703 | 1/2004 |

OTHER PUBLICATIONS

Japanese Office Action for corresponding Japanese Patent Application No. 2009-050864, issued Oct. 1, 2013, 6 pages.
Japanese Office Action for related Japanese Patent Application No. 2009-050864, issued May 20, 2014, 4 pages.

* cited by examiner

*Primary Examiner* — Patrick Edouard
*Assistant Examiner* — Julio Perez
(74) *Attorney, Agent, or Firm* — Staas & Halsey LLP

(57) ABSTRACT

A base station apparatus includes a wireless receiving unit wirelessly receiving identification information on a terminal apparatus located in the vicinity of the base station apparatus; a storage unit storing the identification information received by the wireless receiving unit; a request receiving unit receiving, from a communication apparatus, a start request containing identification information regarding a terminal apparatus to be started; a determination unit determining whether the identification information contained in the start request received by the request receiving unit having been stored in the storage unit; and a distribution unit wirelessly distributing a start instruction to start the terminal apparatus indicated by the identification information upon the determination unit determining the identification information having been stored in the storage unit.

13 Claims, 15 Drawing Sheets

FIG. 14

| COMMAND ID | COMMAND PAYLOAD | | COMMAND |
| --- | --- | --- | --- |
| | PAYLOAD LENGTH | VALUE | |
| 0x81 | 6 | MAC ADDRESS | DELIVERY OF MAC ADDRESS |
| 0x83 | 0 | | START INSTRUCTION |
| 0x84 | 0 | | Ack IN RESPONSE TO START INSTRUCTION |

BASE STATION APPARATUS, TERMINAL APPARATUS, AND COMMUNICATION METHOD

CROSS-REFERENCE TO RELATED APPLICATIONS

This application is based upon and claims the benefit of priority of the prior Japanese Patent Application No. 2009-050864, filed on Mar. 4, 2009, the entire contents of which are incorporated herein by reference.

BACKGROUND

In recent years, around the world, eco-friendly goods and green information and communication technology (ICT) have been becoming widespread, and it is desirable that personal computers (PCs) that are not in use (e.g., during nighttime) be turned off. In such an environment, in order to do maintenance on all PCs during nighttime, a wake-on-LAN (WOL) technology in which the PCs are remotely turned on is widely used.

In a WOL technology, an external communication apparatus sends a start request called magic packet to PCs in a wired local area network (LAN). A LAN interface of each of the PCs is connected to a network device, such as a router or a hub, using, for example, an unshielded twist pair (UTP) cable.

The LAN interface of each of the PC receives a small amount of electric power from, for example, a motherboard even when the PC is turned off so as to receive a magic packet sent from the external communication apparatus. Upon receiving a magic packet destined for itself, the LAN interface instructs the motherboard to turn on the PC. In this way, the PC is started.

In general, a magic packet is delivered via wired communication by, for example, broadcasting. The LAN interface of each of the PCs detects a magic packet delivered by broadcasting and destined for the PC. When the LAN interface detects a magic packet that instructs the PC to turn on, the LAN interface performs the above-described start operation.

On the other hand, in recent years, a wireless LAN that forms a wireless communication network between a base station apparatus and a terminal apparatus connected to the network has been used in order to reduce the wiring cost in addition to increasing the portability of the terminal apparatus. Furthermore, for a wireless LAN, a technique for remotely turning on a base station apparatus connected to a network has been developed (refer to, for example, Japanese Unexamined Patent Application Publication (Translation of PCT Application) No. 2005-535169).

SUMMARY

The inventors propose a base station apparatus including: a wireless receiving unit wirelessly receiving identification information on a terminal apparatus located in the vicinity of the base station apparatus; a storage unit storing the identification information received by the wireless receiving unit; a request receiving unit receiving, from a communication apparatus, a start request containing identification information regarding a terminal apparatus to be started; a determination unit determining whether the identification information contained in the start request received by the request receiving unit having been stored in the storage unit; and a distribution unit wirelessly distributing a start instruction to start the terminal apparatus indicated by the identification information upon the determination unit determining the identification information having been stored in the storage unit.

The object and advantages will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates information contained in a MAC layer payload shown in FIG. 13.

DESCRIPTION OF EMBODIMENTS

Embodiments of a base station apparatus, a terminal apparatus, and a communication method are described in detail below with reference to the accompanying drawings.

Embodiments

Configurations of Communication System and Base Station Apparatus

Figure 1:
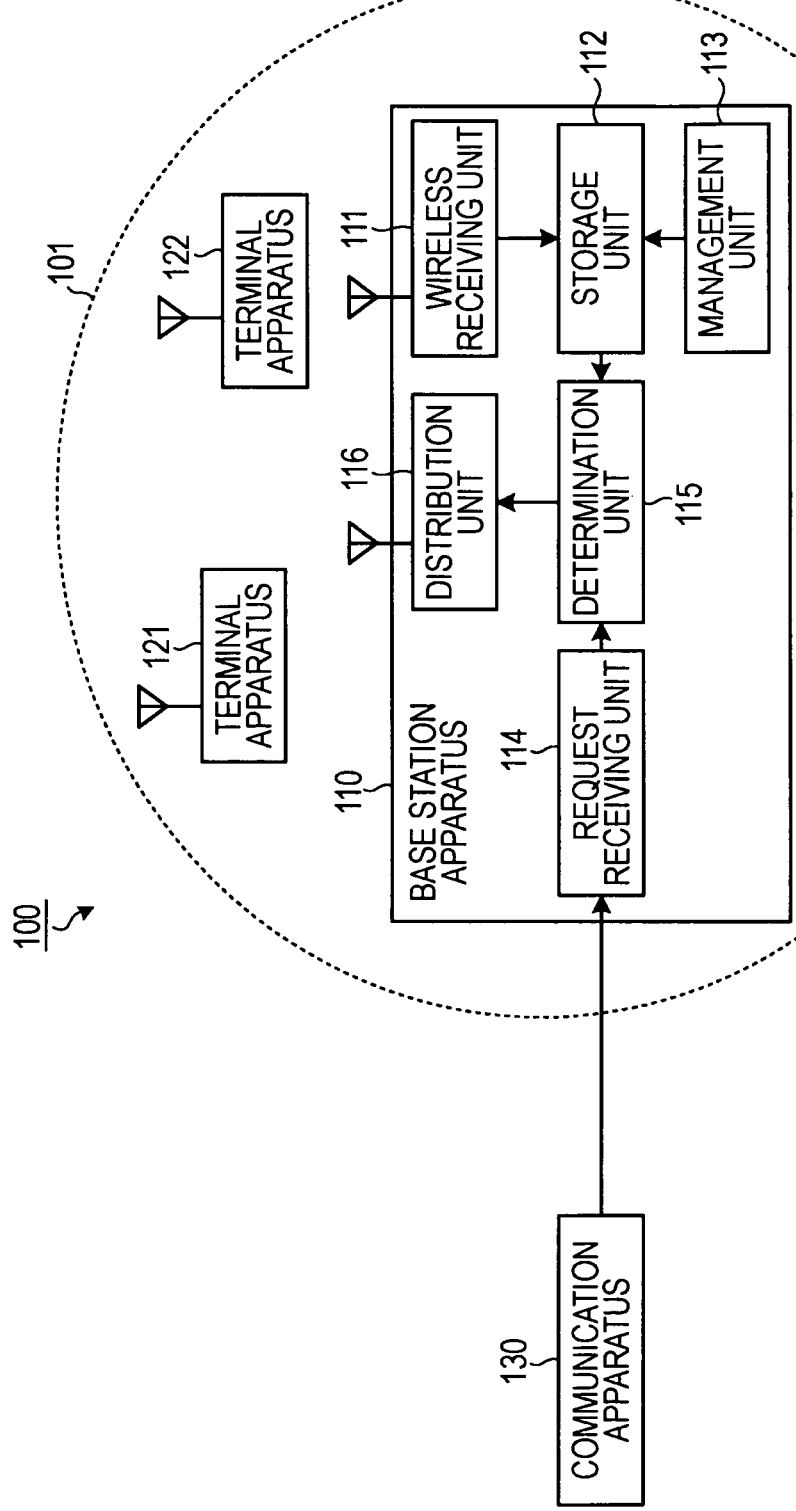
FIG. 1 is a block diagram of an exemplary configuration of a communication system according to an embodiment of the proposal.

FIG. 1 is a block diagram of an exemplary configuration of a communication system according to an embodiment. As shown in FIG. 1, according to the present embodiment, a communication system 100 includes a base station apparatus 110, terminal apparatuses 121 and 122, and a communication apparatus 130. The terminal apparatuses 121 and 122 are located in the vicinity of the base station apparatus 110. As used herein, the term "vicinity of the base station apparatus 110" refers to a range in which radio waves transmitted from the base station apparatus 110 can travel. An example of the range is a room in which the base station apparatus 110 is placed.

The base station apparatus 110 and the terminal apparatuses 121 and 122 form a wireless communication network 101 (e.g., a LAN) by transmitting and receiving radio waves. Each of the terminal apparatuses 121 and 122 periodically wirelessly transmit the identification information thereof to the base station apparatus 110. An example of the identification information is a MAC address of each of the terminal apparatuses 121 and 122.

The base station apparatus 110 includes a wireless receiving unit 111, a storage unit 112, and a management unit 113, a request receiving unit 114, a determination unit 115, and a distribution unit 116. The wireless receiving unit 111 wirelessly receives the identification information of the terminal apparatuses 121 and 122 from the terminal apparatuses 121 and 122. Thereafter, the wireless receiving unit 111 outputs the wirelessly received identification information to the storage unit 112.

For example, the wireless receiving unit 111 is formed from an ultraweak radio wave module that emits ultraweak radio waves. The wireless receiving unit 111 is provided separately from a communication interface (e.g., a wireless LAN interface) (not shown) used when the base station apparatus 110 communicates with the terminal apparatuses 121 and 122 that are turned on. In this case, the wireless receiving unit 111 receives the identification information wirelessly transmitted from the terminal apparatuses 121 and 122.

The storage unit 112 stores the identification information output from the wireless receiving unit 111. The management unit 113 manages the identification information stored in the storage unit 112. More specifically, the management unit 113 deletes the identification information that has not been received again by the wireless receiving unit 111 for a predetermined period of time from among the identification information stored in the storage unit 112.

The request receiving unit 114 receives a start request for requesting start-up of a particular terminal apparatus from the communication apparatus 130. The start request received by the request receiving unit 114 includes the identification information regarding the terminal apparatus to be started. For example, a magic packet including the MAC address serving as the identification information is used as the start request. The request receiving unit 114 outputs the received start request to the determination unit 115.

The determination unit 115 determines whether the identification information included in the start request output from the request receiving unit 114 is stored in the storage unit 112. If the determination unit 115 determines that the identification information included in the start request is stored in the storage unit 112, the determination unit 115 sends the identification information included in the start request to the distribution unit 116. The distribution unit 116 wirelessly distributes, in the vicinity of the base station apparatus 110, a start instruction for instructing start-up of the terminal apparatus indicated by the identification information received from the determination unit 115.

For example, the distribution unit 116 is formed from an ultraweak radio wave module that emits ultraweak radio waves. The distribution unit 116 is provided separately from a communication interface (e.g., a wireless LAN interface) (not shown) that communicates with the terminal apparatuses 121 and 122 when the base station apparatus 110 is turned on. In this case, the distribution unit 116 wirelessly distributes the start instruction.

For example, the communication interface (not shown) that communicates with the terminal apparatuses 121 and 122 when the base station apparatus 110 is turned on is a wireless LAN module that supports IEEE 802.11a (5-GHz band). In contrast, each of the wireless receiving unit 111 and the distribution unit 116 is an ultraweak radio wave module that supports IEEE 802.15.4 (2.4-GHz band).

In this case, a similar ultraweak radio wave module is provided in each of the terminal apparatuses 121 and 122. In addition, a non beacon-enabled network model is employed as a MAC layer link data transmission model between the wireless receiving unit 111 and each of the distribution unit 116 and the terminal apparatuses 121 and 122.

The communication apparatus 130 transmits, to the base station apparatus 110, a start request including the identification information regarding the unit to be started. Communication between the communication apparatus 130 and the base station apparatus 110 may be wired communication or wireless communication. For example, the communication apparatus 130 is operated by an administrator of the terminal apparatus 121 or 122. The administrators of the terminal apparatus 121 and 122 can remotely operate the terminal apparatus 121 and 122, respectively, by transmitting the start request from the communication apparatus 130.

Operation Performed by Base Station Apparatus

Figure 2:
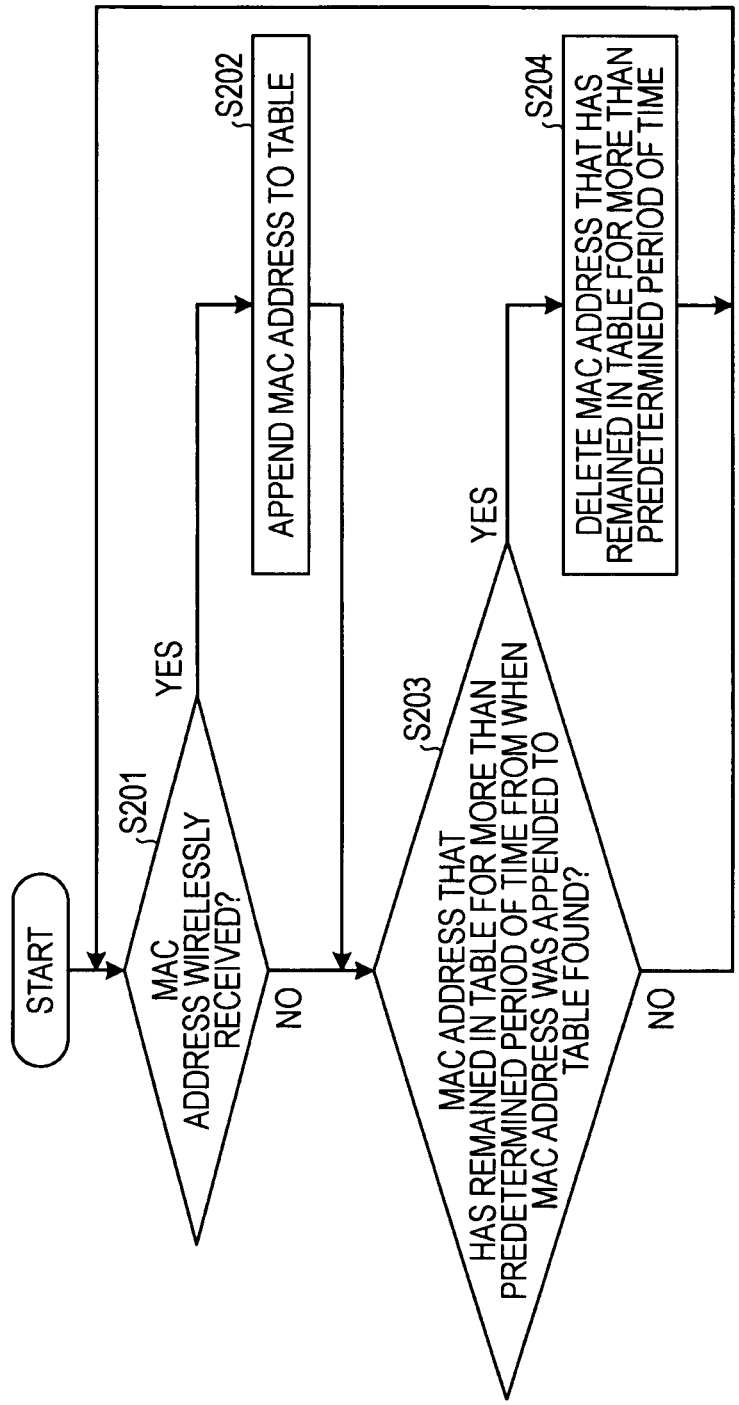
FIG. 2 is a flowchart of an exemplary operation for receiving identification information performed by a base station apparatus shown in FIG. 1.

FIG. 2 is a flowchart of an exemplary operation for receiving the identification information performed by the base station apparatus shown in FIG. 1. For example, the base station apparatus 110 shown in FIG. 1 performs an operation for receiving identification information in a manner described below. First, the wireless receiving unit 111 determines whether it has wirelessly received a MAC address transmitted from a terminal apparatus located in the vicinity of the base station apparatus 110 (e.g., the terminal apparatus 121 or 122) (step S201).

If, in step S201, the wireless receiving unit 111 has not received a MAC address ("No" in Step S201), the processing proceeds to step S203. However, if the wireless receiving unit 111 has received a MAC address ("Yes" in step S201), the storage unit 112 appends the MAC address wirelessly received in step S201 to a table (step S202).

Subsequently, the management unit 113 determines whether a MAC address that has remained in the table for more than a predetermined period of time from when the MAC address was appended to the table in step S202 is found (step S203). If a MAC address that has remained in the table for more than a predetermined period of time from when the MAC address was appended to the table is not found ("No" in step S203), the processing returns to step S201, and the above-described processing is repeated.

If, in step S203, a MAC address that has remained in the table stored in the storage unit 112 for more than a predetermined period of time from when the MAC address was appended to the table is found ("Yes" in step S203), the management unit 113 deletes the found MAC address from the table (step S204). Thereafter, the processing returns to step S201, and the above-described processing is repeated.

Through the above-described steps, the identification information regarding the terminal apparatuses 121 and 122 located in the vicinity of the base station apparatus 110 is wirelessly received and can be stored in the storage unit 112. In addition, among the MAC addresses (the identification information items) stored in the storage unit 112, the identification information that has not been received by the wireless receiving unit 111 for a predetermined period of time can be deleted from the storage unit 112.

Figure 3:
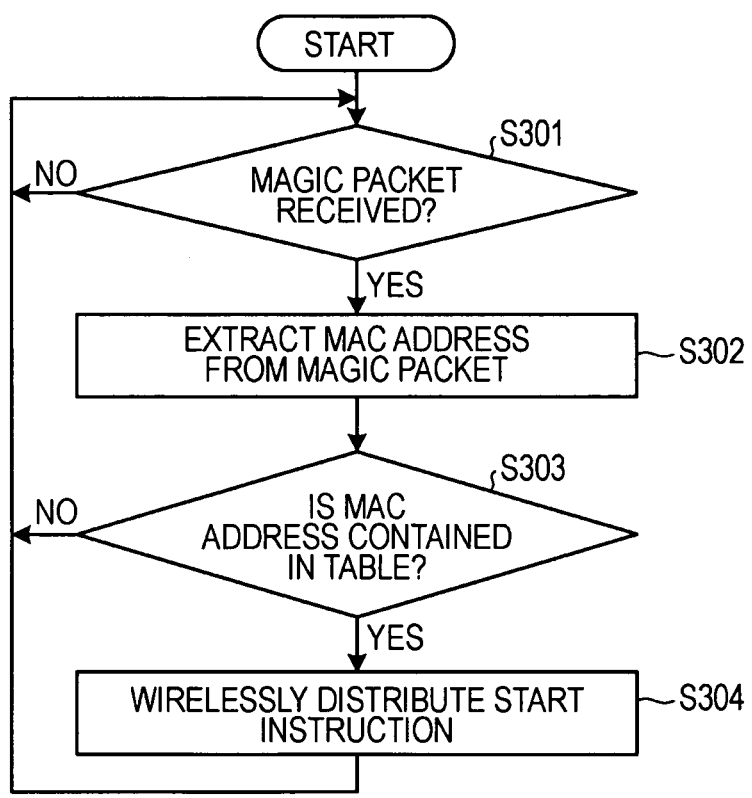
FIG. 3 is a flowchart of an exemplary operation for distributing a start instruction performed by the base station apparatus shown in FIG. 1.

FIG. 3 is a flowchart of an exemplary operation for distributing the start instruction performed by the base station apparatus shown in FIG. 1. In addition to the operation for receiving the identification information as shown in FIG. 2, the base station apparatus 110 shown in FIG. 1 performs, for example, an operation for distributing a start instruction as described below. First, the request receiving unit 114 determines whether it has received a magic packet transmitted from the communication apparatus 130 (step S301) and waits until it receives a magic packet (a loop in the case of "No" in step S301).

If, in step S301, a magic packet is received ("Yes" in step S301), the determination unit 115 extracts the MAC address from the magic packet received in step S301 (step S302). Thereafter, the determination unit 115 determines whether the MAC address extracted in step S302 is contained in the table stored in the storage unit 112 (step S303).

If, in step S303, it is determined that the extracted MAC address is not contained in the table stored in the storage unit 112 ("No" in step S303), the processing returns to step S301, and the above-described processing is repeated. However, if the extracted MAC address is contained in the table stored in the storage unit 112 ("Yes" in step S303), the distribution unit 116 wirelessly distributes a start instruction to terminal apparatuses located in the vicinity of the base station apparatus 110 (step S304). Thereafter, the processing returns to step S301, and the above-described processing is repeated.

The start instruction wirelessly distributed in step S304 contains the MAC address extracted in step S302 serving as identification information. Through the above-described steps, upon receiving the magic packet from the communication apparatus 130, the base station apparatus 110 can determine whether a terminal apparatus indicated by the received magic packet is under the control of the base station apparatus 110.

If the terminal apparatus indicated by the received magic packet is under the control of the base station apparatus 110, the base station apparatus 110 wirelessly distributes a start instruction for the terminal apparatus indicated by the MAC address contained in the magic packet to all terminal apparatuses located in the vicinity of the base station apparatus 110. Thus, the base station apparatus 110 can remotely start the terminal apparatus to be started. However, if the terminal apparatus indicated by the received magic packet is not under the control of the base station apparatus 110, the base station apparatus 110 discards the received magic packet. Accordingly, wireless distribution of a useless start instruction can be prevented.

Configuration of Terminal Apparatus

Figure 4:
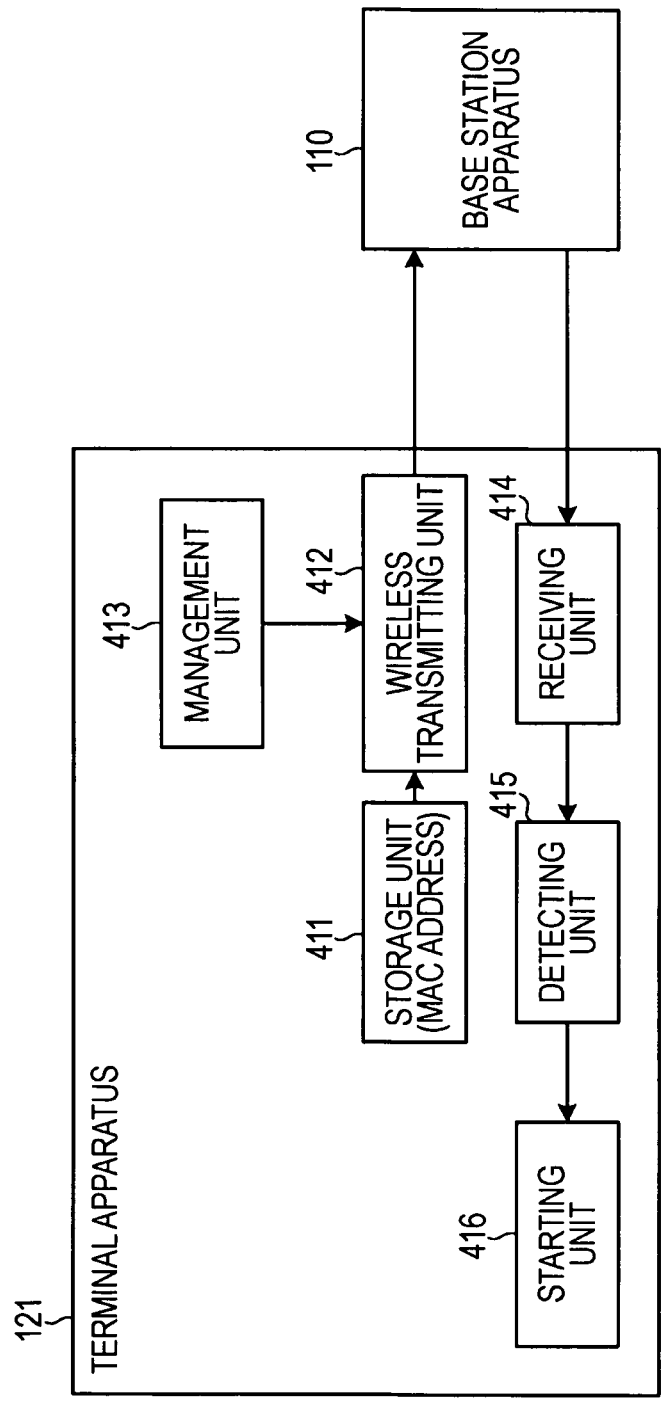
FIG. 4 is a block diagram of an exemplary configuration of a terminal apparatus shown in FIG. 1.

FIG. 4 is a block diagram of an exemplary configuration of the terminal apparatus shown in FIG. 1. As shown in FIG. 4, the terminal apparatus 121 (refer to FIG. 1) includes a storage unit 411, a wireless transmitting unit 412, a management unit 413, a receiving unit 414, a detecting unit 415, and a starting unit 416. The identification information on the terminal apparatus 121 is stored in the storage unit 411. For example, the MAC address assigned to the terminal apparatus 121 serves as the identification information on the terminal apparatus 121.

The wireless transmitting unit 412 reads the identification information stored in the storage unit 411. The wireless transmitting unit 412 then wirelessly transmits the readout identification information to the base station apparatus 110. The management unit 413 manages the wireless transmission of identification information performed by the wireless transmitting unit 412. For example, when the base station apparatus 110 is turned off, the management unit 413 controls the wireless transmitting unit 412 so that the wireless transmitting unit 412 periodically wirelessly transmits the identification information.

The receiving unit 414 receives the start instruction wirelessly distributed from the base station apparatus 110. Thereafter, the receiving unit 414 outputs the received start instruction to the detecting unit 415. The detecting unit 415 detects whether the receiving unit 414 receives a start instruction for instructing start-up of the terminal apparatus 121. More specifically, the detecting unit 415 extracts the identification information contained in the start instruction output from the receiving unit 414 and determines whether the extracted identification information is the same as the identification information on the terminal apparatus 121.

For example, the identification information on the terminal apparatus 121 can be acquired by reading the storage unit 411. If the extracted identification information is the same as the identification information on the terminal apparatus 121, the detecting unit 415 outputs a detection signal to the starting unit 416. Upon receiving the detection signal from the detecting unit 415, the starting unit 416 turns on the terminal apparatus 121. In addition, the starting unit 416 may transmit a start message indicating that the terminal apparatus 121 is turned on to the base station apparatus 110 using the wireless transmitting unit 412.

Even when the terminal apparatus 121 is turned off, the components of the terminal apparatus 121 shown in FIG. 4 are supplied with a small amount of power by, for example, the motherboard of the terminal apparatus 121. For example, the wireless transmitting unit 412 and the receiving unit 414 are formed from ultra weak radio wave modules separately provided from the communication interface (e.g., the wireless LAN interface) that communicates with the base station apparatus 110 when the terminal apparatus 121 is turned on. The wireless transmitting unit 412 and the receiving unit 414 emit ultraweak radio waves.

In this case, the wireless transmitting unit 412 wirelessly transmits the identification information using ultraweak radio waves. In addition, the receiving unit 414 receives a start instruction wirelessly distributed from the ultraweak radio wave module of the base station apparatus 110 using ultraweak radio waves. While the terminal apparatus 121 has been described, the same applies to the terminal apparatus 122 (refer to FIG. 1).

Operation Performed by Terminal Apparatus

Figure 5:
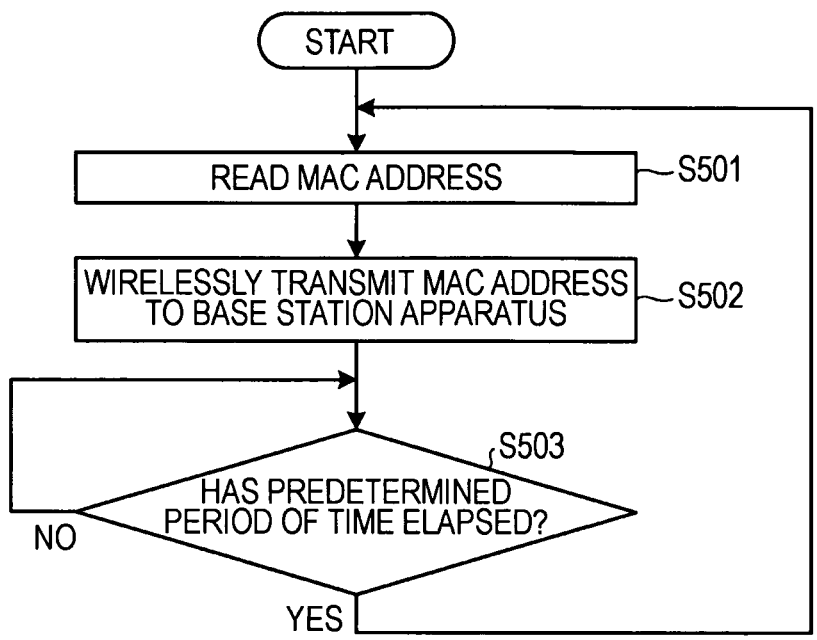
FIG. 5 is a flowchart of an exemplary operation for transmitting identification information performed by the terminal apparatus shown in FIG. 4.

FIG. 5 is a flowchart of an exemplary operation for transmitting identification information performed by the terminal apparatus shown in FIG. 4. For example, the terminal apparatus 121 shown in FIG. 4 performs an operation for transmitting the identification information as described below. First, the wireless transmitting unit 412 reads the MAC address stored in the storage unit 411 (step S501). Thereafter, the wireless transmitting unit 412 wirelessly transmits the MAC address read out in step S501 to the base station apparatus 110 (step S502).

Subsequently, the management unit 413 determines whether a predetermined period of time has elapsed since the MAC address was wirelessly transmitted in step S502 (step S503). If the predetermined period of time has not yet elapsed, the management unit 413 waits until the predetermined period of time has elapsed (a loop in the case of "No" in step S503). However, if the predetermined period of time has elapsed ("Yes" in step S503), the processing returns to step S501, and the above-described processing is repeated.

The above-described steps are performed when, for example, the terminal apparatus 121 is turned off. In this way, the MAC address (the identification information) of the terminal apparatus 121 can be periodically wirelessly transmitted to the base station apparatus 110. While an operation for transmitting the identification on the terminal apparatus 121 has been described, the same applies to an operation for transmitting the identification information on the terminal apparatus 122 (refer to FIG. 1).

Figure 6:
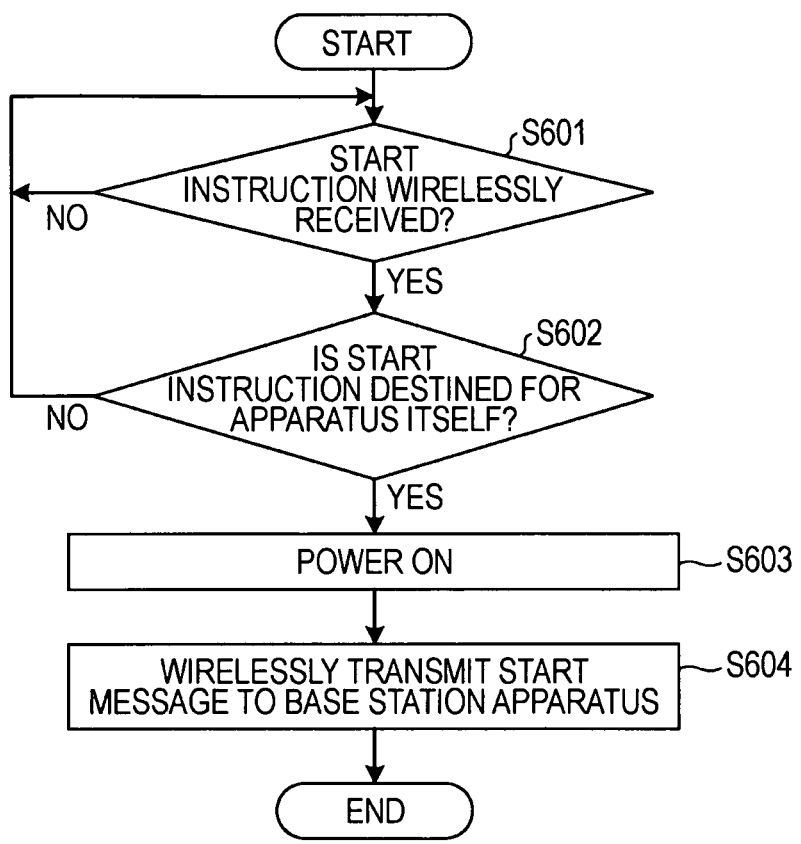
FIG. 6 is a flowchart of an exemplary operation for starting the terminal apparatus shown in FIG. 4.

FIG. 6 is a flowchart of an exemplary operation for starting the terminal apparatus shown in FIG. 4. For example, the terminal apparatus 121 shown in FIG. 4 performs the following start operation in addition to performing the operation for transmitting the identification information shown in FIG. 5. First, the receiving unit 414 determines whether it has received a start instruction wirelessly distributed from the base station apparatus 110 (step S601). If the receiving unit 414 has not yet received a start instruction, the receiving unit 414 waits until it receives a start instruction (a loop in the case of "No" in step S601).

If, in step S601, the receiving unit 414 wirelessly receives a start instruction ("Yes" in step S601), the detecting unit 415 determines whether the start instruction wirelessly received in step S601 is destined for itself (i.e., destined for the terminal apparatus 121) (step S602). If the start instruction is destined for an apparatus other than the terminal apparatus 121 ("No" in step S602), the processing returns to step S601, and the above-described processing is repeated.

However, if, in step S602, the start instruction is destined for itself (i.e., destined for the terminal apparatus 121) ("Yes" in step S602), the starting unit 416 turns on the terminal apparatus 121 (step S603). Thereafter, the wireless transmitting unit 412 wirelessly transmits a start message to the base station apparatus 110 (step S604). Thus, the series of processes is completed.

Through the above-described steps, among start instructions wirelessly distributed from the base station apparatus 110, the start instruction for instructing start-up of the terminal apparatus 121 can be detected, and the terminal apparatus 121 can be turned on. In addition, after the terminal apparatus 121 is turned on through the above-described steps, the operation for transmitting identification information as shown in FIG. 5 may be stopped. While an operation for starting the terminal apparatus 121 has been described, the same applies to the operation for starting the terminal apparatus 122 (refer to FIG. 1).

Operation Performed by Communication Apparatus

Figure 7:
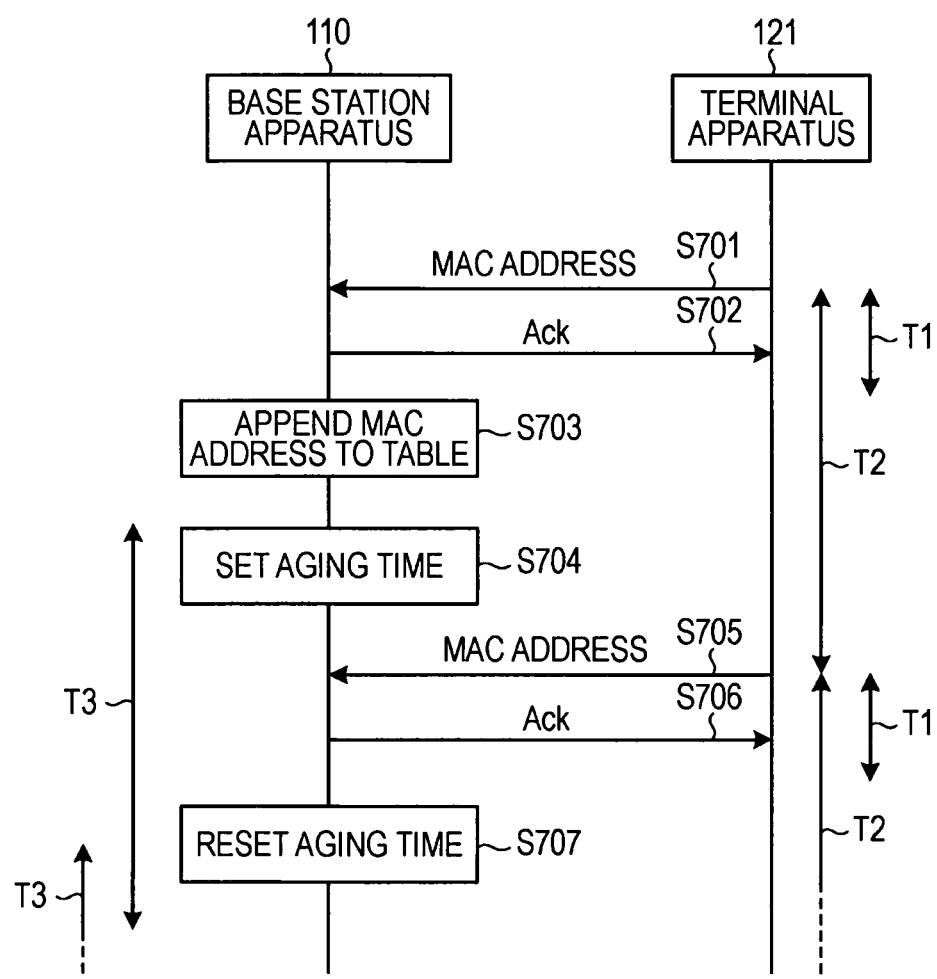
FIG. 7 is a sequence diagram illustrating an exemplary operation for managing the identification information performed in the communication system shown in FIG. 1.

FIG. 7 is a sequence diagram illustrating an exemplary operation for managing the identification information performed in the communication system shown in FIG. 1. For example, the base station apparatus 110 and the terminal apparatus 121 shown in FIG. 1 perform the following operations for managing the identification information. First, the terminal apparatus 121 transmits a MAC address assigned to the terminal apparatus 121 to the base station apparatus 110 (step S701).

Subsequently, in response to the MAC address transmitted in step S701, the base station apparatus 110 transmits Ack to the terminal apparatus 121 (step S702). A period of time T1 represents a waiting period of time from when the terminal apparatus 121 transmits the MAC address in step S701 to when the terminal apparatus 121 receives Ack returned from the base station apparatus 110.

In this example, Ack is returned from the base station apparatus 110 to the terminal apparatus 121 within the period of time T1. In such a case, the terminal apparatus 121 determines that the MAC address is received by the base station apparatus 110 and, therefore, does not retransmit the MAC address.

Subsequently, the base station apparatus 110 appends the MAC address transmitted in step S701 to the table stored in the storage unit 112 (step S703). Thereafter, the base station apparatus 110 sets aging time (predetermined time) T3 for the MAC address appended to the table in step S703 (step S704).

Subsequently, when a period of time T2 has elapsed since the MAC address was transmitted in step S701, the terminal apparatus 121 retransmits the MAC address assigned to the terminal apparatus 121 to the base station apparatus 110 (step S705). Note that the period of time T2 is longer than the period of time T1. Thereafter, the base station apparatus 110 transmits, to the terminal apparatus 121, Ack in response to the MAC address transmitted in step S705 (step S706).

Subsequently, the base station apparatus 110 resets the aging time T3 for the MAC address transmitted in step S705 (step S707). Thereafter, the processing similar to that in steps S705 to S707 is repeated. Through the above-described steps, the MAC address of the terminal apparatus 121 is transmitted from the terminal apparatus 121 to the base station apparatus 110 at intervals of the period of time T2.

The management unit 113 of the base station apparatus 110 decrements the aging time T3 set in step S704 as time passes. If the aging time T3 reaches zero, the management unit 113 of the base station apparatus 110 deletes the MAC address appended to the table in step S703.

In this example, since the MAC address is received again in step S705 before the aging time T3 reaches zero, the aging time T3 is reset in step S707. Accordingly, the MAC address is not deleted and remains in the table. While an operation for managing the identification information exchanged between the base station apparatus 110 and the terminal apparatus 121 has been described above, a similar management operation of identification information is performed for exchange between the base station apparatus 110 and the terminal apparatus 122.

Figure 8:
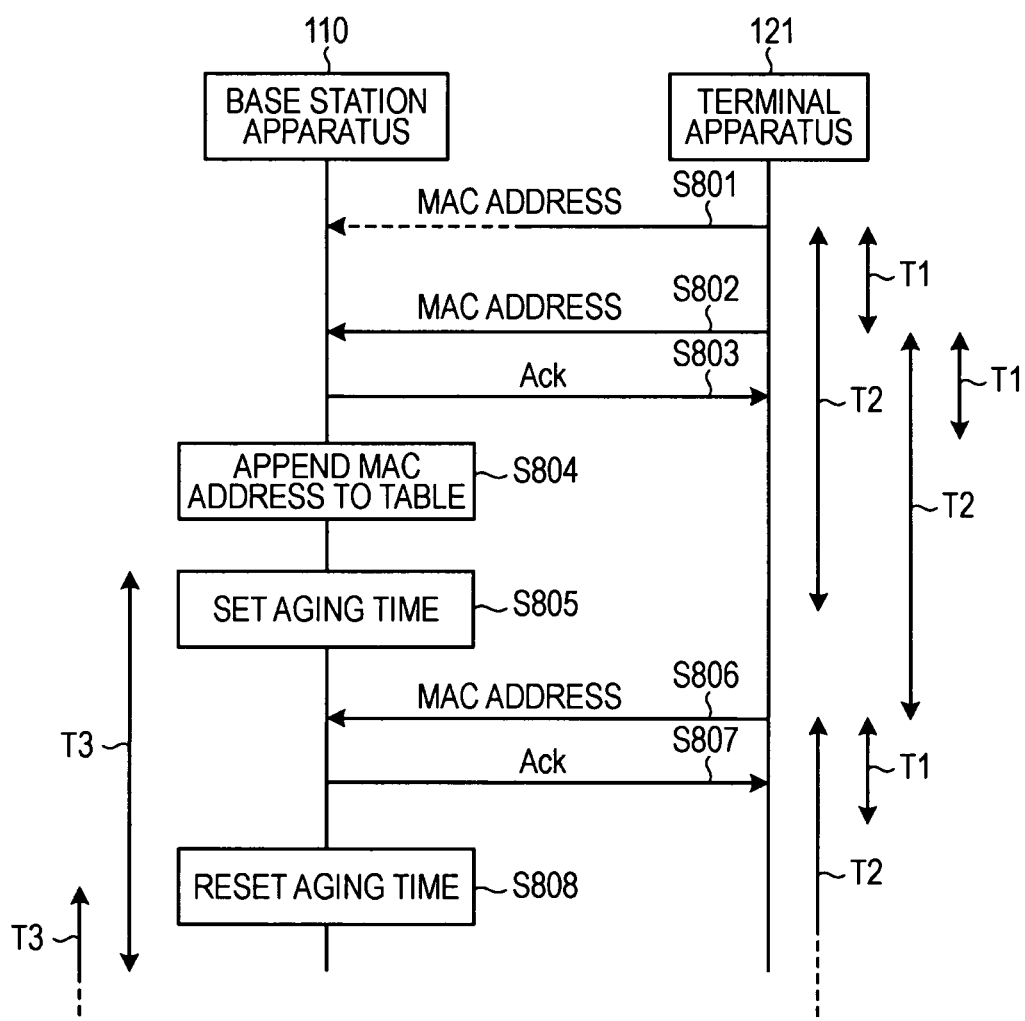
FIG. 8 is a sequence diagram illustrating another example of the operation for managing the identification information performed in the communication system shown in FIG. 1.

FIG. 8 is a sequence diagram illustrating another example of the operation for managing the identification information performed in the communication system shown in FIG. 1. For example, the base station apparatus 110 and the terminal apparatus 121 shown in FIG. 1 perform the following operations for managing identification information. First, the terminal apparatus 121 transmits the MAC address assigned to the terminal apparatus 121 to the base station apparatus 110 (step S801).

Suppose that, in step S801, the MAC address transmitted from the terminal apparatus 121 is not received by the base station apparatus 110 due to some error. In such a case, Ack is not transmitted from the base station apparatus 110 to the terminal apparatus 121. Since the terminal apparatus 121 does not receive Ack within the period of time T1 from when the MAC address was transmitted in step S801, the terminal apparatus 121 retransmits the MAC address to the base station apparatus 110 when the period of time T1 has elapsed (step S802).

In addition, the terminal apparatus 121 starts remeasuring the period of time T1 and the period of time T2 when the MAC address is retransmitted in step S802. In step S802, the MAC address transmitted from the terminal apparatus 121 is received by the base station apparatus 110.

Subsequently, the base station apparatus 110 transmits, to the terminal apparatus 121, Ack in response to the MAC address transmitted in step S802 (step S803). The processing performed in steps S804 to S808 is similar to that performed in steps S703 to S707 shown in FIG. 7. Accordingly, the description thereof is not repeated. While an operation for managing the identification information exchanged between the base station apparatus 110 and the terminal apparatus 121 has been described, the same applies to the operation for managing the identification information exchanged between the base station apparatus 110 and the terminal apparatus 122.

Figure 9:
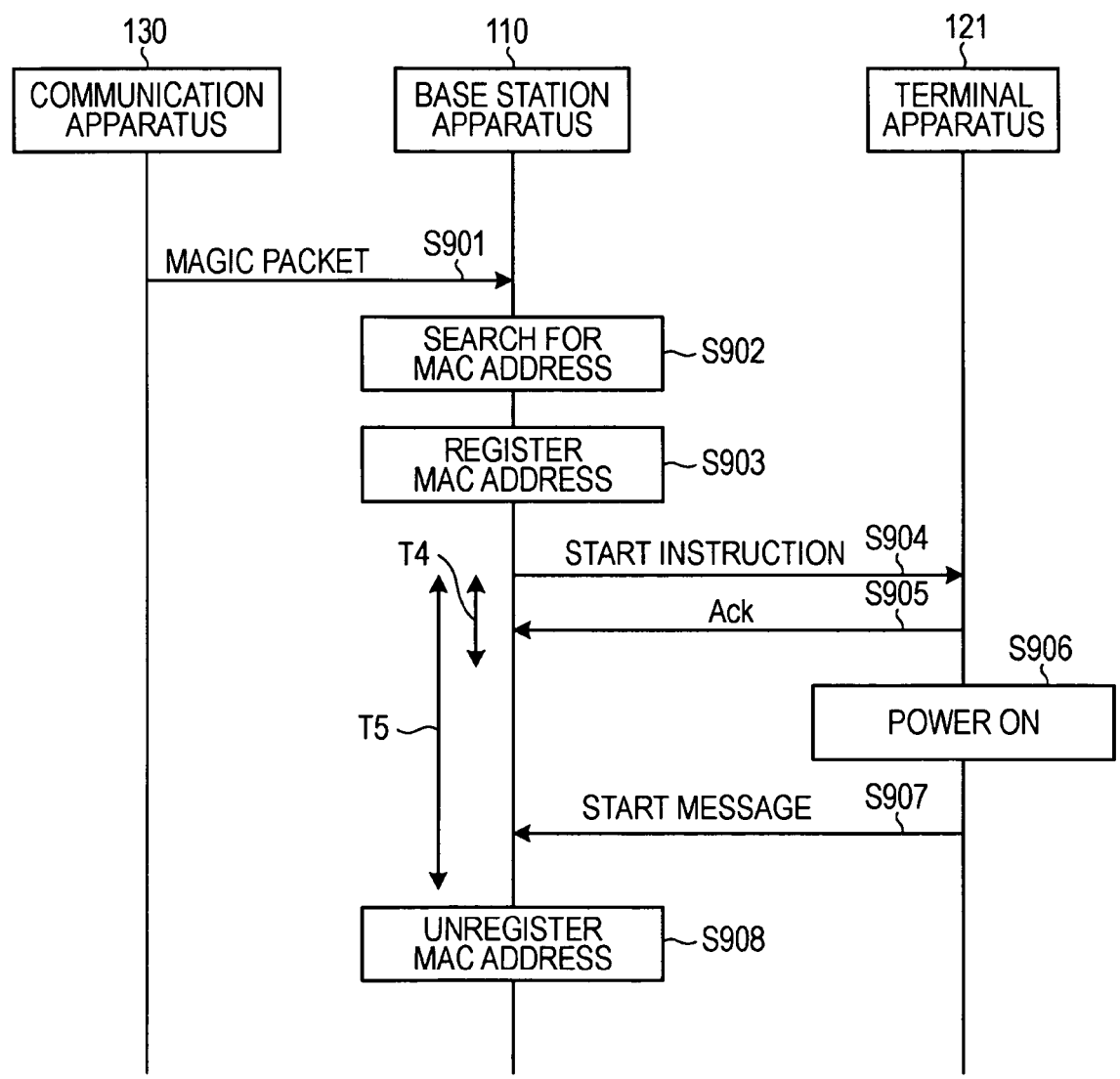
FIG. 9 is a sequence diagram illustrating an example of a remote start operation performed in the communication system shown in FIG. 1.

FIG. 9 is a sequence diagram illustrating an example of a remote start operation performed in the communication system shown in FIG. 1. The base station apparatus 110, the terminal apparatus 121, and the communication apparatus 130 shown in FIG. 1 perform, for example, the following remote start operation in addition to the operation for transmitting the identification information illustrated in FIG. 7 or 8. First, the communication apparatus 130 transmits, to the base station apparatus 110, a magic packet containing the MAC address of the terminal apparatus 121 serving as the identification information for identifying the apparatus to be started (step S901).

Subsequently, the base station apparatus 110 extracts the MAC address from the magic packet transmitted in step S901 and searches the table stored in the storage unit 112 for the extracted MAC address (step S902). In this example, the MAC address was wirelessly transmitted from the terminal apparatus 121 to the base station apparatus 110 in advance, and the extracted MAC address is found in the table stored in the storage unit 112 of the base station apparatus 110.

Subsequently, the base station 110 registers the MAC address extracted from the magic packet as identification information indicating the apparatus to be started (step S903). Thereafter, the base station 110 wirelessly distributes a start instruction containing the MAC address extracted from the magic packet (step S904). The start instruction wirelessly transmitted in step S904 is received by the terminal apparatus 121.

Subsequently, the terminal apparatus 121 wirelessly transmits, to the base station apparatus 110, Ack in response to the start instruction wirelessly distributed in step S904 (step S905). A period of time T4 represents a waiting time of the base station apparatus 110 from when the base station apparatus 110 transmits the start instruction in step S904 to when the base station apparatus 110 receives Ack from the terminal apparatus 121.

In this example, Ack is transmitted from the terminal apparatus 121 to the base station apparatus 110 within the period of time T4. In such a case, the base station apparatus 110 determines that the MAC address is received by the terminal apparatus 121 and, therefore, the base station apparatus 110 does not retransmit the start instruction. Thereafter, the terminal apparatus 121 turns on the terminal apparatus 121 (step S906). The terminal apparatus 121 then wirelessly transmits, to the base station apparatus 110, a start message indicating that the terminal apparatus 121 is turned on (step S907).

A period of time T5 represents a waiting time of the base station apparatus 110 from when the base station apparatus 110 transmits the start instruction to when the base station apparatus 110 receives the start message from the terminal apparatus 121. In this example, the start message transmitted from the terminal apparatus 121 is received by the base station apparatus 110 within the period of time T5. In such a case, the base station apparatus 110 determines that the terminal apparatus 121 has been started and, therefore, the base station apparatus 110 does not redistribute the start instruction.

Subsequently, the base station apparatus 110 unregisters the MAC address registered in step S903 (step S908). Thereafter, the series of processes is completed. While remote start operations performed by the base station apparatus 110, the terminal apparatus 121, and the communication apparatus 130 have been described, the same can apply to remote start operations performed by the base station apparatus 110, the terminal apparatus 122, and the communication apparatus 130.

Figure 10:
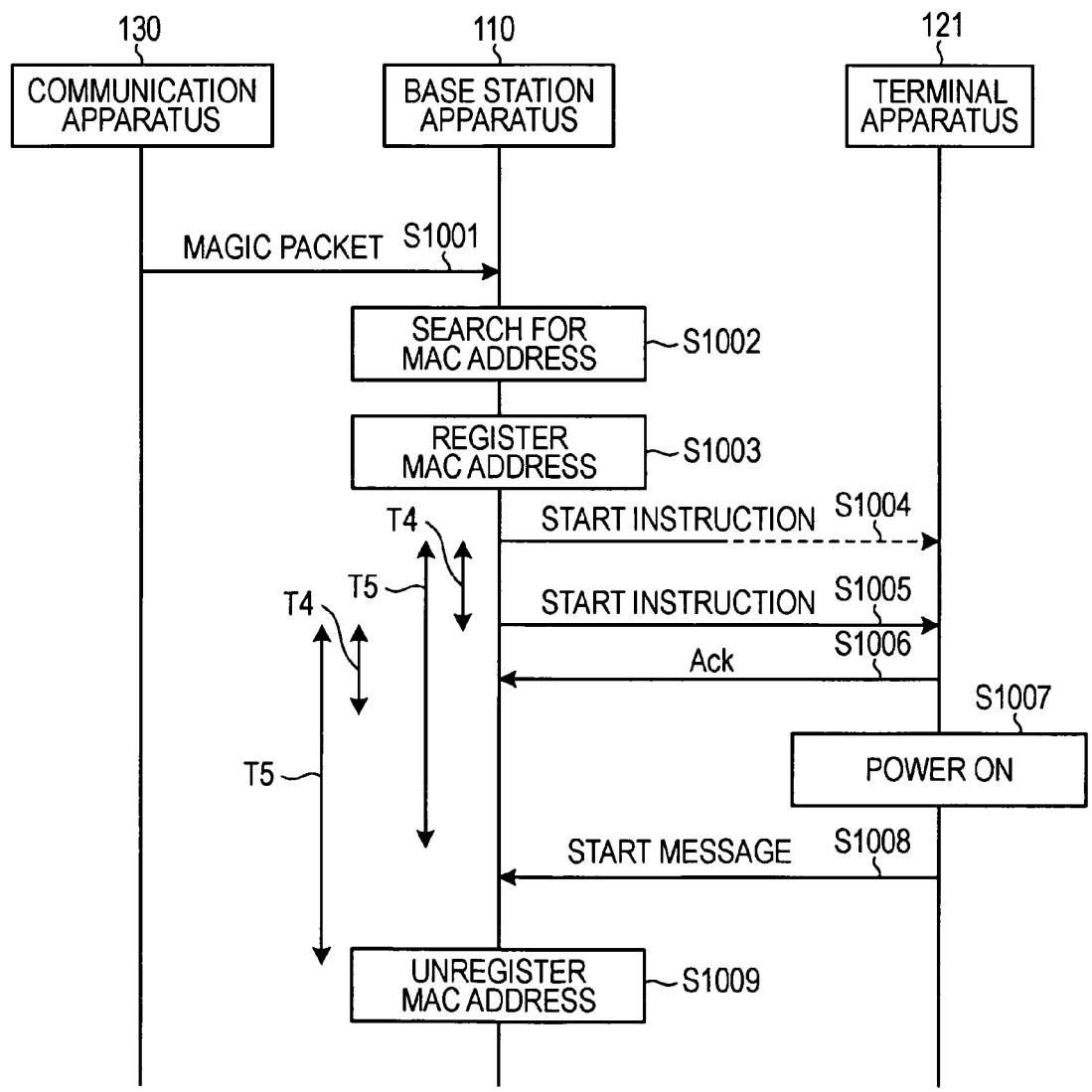
FIG. 10 is a sequence diagram illustrating another example of a remote start operation performed in the communication system shown in FIG. 1.

FIG. 10 is a sequence diagram illustrating another example of a remote start operation performed in the communication system shown in FIG. 1. The base station apparatus 110, the terminal apparatus 121, and the communication apparatus 130 shown in FIG. 1 perform, for example, the following remote start operation in addition to performing the operation for transmitting the identification information illustrated in FIG. 7 or 8. Since steps S1001 to S1004 shown in FIG. 10 are similar to steps S901 to S904 shown in FIG. 9, respectively, the descriptions thereof are not repeated.

However, in this example, in step S1004, a start instruction transmitted from the base station apparatus 110 is not received by the terminal apparatus 121 due to an error. In such a case, Ack is not transmitted from the terminal apparatus 121 to the base station apparatus 110.

Since the base station apparatus 110 has not received Ack within the period of time T4 from when the base station apparatus 110 distributed the start instruction in step S1004, the base station apparatus 110 wirelessly redistributes the start instruction when the period of time T4 has elapsed (step S1005). In step S1005, it is assumed that the start instruction wirelessly distributed from the base station apparatus 110 is received by the terminal apparatus 121.

In addition, the base station apparatus 110 starts remeasuring the period of time T4 and the period of time T5 when the base station apparatus 110 wirelessly distributes the start instruction in step S1005. Subsequently, the terminal apparatus 121 wirelessly transmits, to the base station apparatus 110, Ack for the start instruction wirelessly distributed in step S1005 (step S1006).

Since steps S1007 to S1009 shown in FIG. 10 are similar to steps S906 to S908 shown in FIG. 9, respectively, the descriptions thereof are not repeated. While remote start operations performed by the base station apparatus 110, the terminal apparatus 121, and the communication apparatus 130 have been described, the same can apply to remote start operations performed by the base station apparatus 110, the terminal apparatus 122, and the communication apparatus 130.

Figure 11:
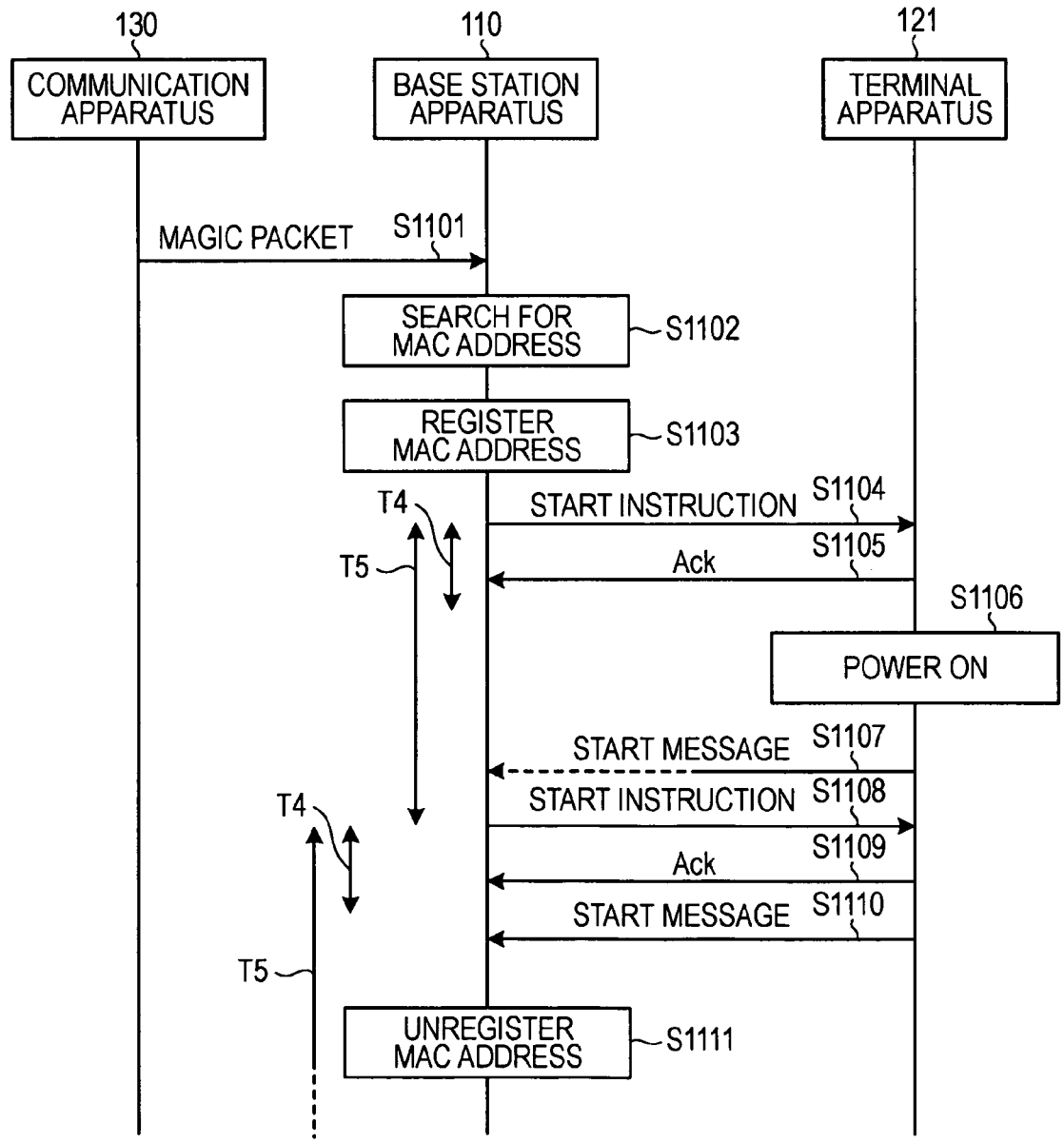
FIG. 11 is a sequence diagram illustrating still another example of a remote start operation performed in the communication system shown in FIG. 1.

FIG. 11 is a sequence diagram illustrating still another example of a remote start operation performed in the communication system shown in FIG. 1. The base station apparatus 110, the terminal apparatus 121, and the communication apparatus 130 shown in FIG. 1 perform, for example, the following remote start operation in addition to performing the operation for transmitting the identification information illustrated in FIG. 7 or 8. Since steps S1101 to S1107 shown in FIG. 11 are similar to steps S901 to S907 shown in FIG. 9, respectively, the descriptions thereof are not repeated.

However, in this example, in step S1107, a start message transmitted from the terminal apparatus 121 is not received by the base station apparatus 110 due to an error. In such a case, since the base station apparatus 110 has not received a start message within the period of time T5 from when the base station apparatus 110 transmitted the start instruction in step S1104, the base station apparatus 110 wirelessly redistributes the start instruction when the period of time T5 has elapsed (step S1108).

In step S1108, it is assumed that the start instruction wirelessly distributed from the base station apparatus 110 is received by the terminal apparatus 121. In addition, the base station apparatus 110 starts remeasuring the period of time T4 and the period of time T5 when the base station apparatus 110 wirelessly distributes the start instruction in step S1108.

Subsequently, the terminal apparatus 121 wirelessly transmits, to the base station apparatus 110, Ack for the start instruction wirelessly distributed in step S1108 (step S1109). In addition, since the terminal apparatus 121 has already been turned on in step S1106, the terminal apparatus 121 wirelessly retransmits the start message to the base station apparatus 110 (step S1110).

Subsequently, the base station apparatus 110 unregisters the MAC address registered in step S1103 (step S1111). Thereafter, the series of processes is completed. While remote start operations performed by the base station apparatus 110, the terminal apparatus 121, and the communication apparatus 130 have been described, the same can apply to remote start operations performed by the base station apparatus 110, the terminal apparatus 122, and the communication apparatus 130.

As illustrated in FIGS. 9 to 11, if a wirelessly distributed start signal is not received by an apparatus to be started (i.e., the terminal apparatus 121 or 122), the distribution unit 116 of the base station apparatus 110 wirelessly redistributes the start signal that was not received. In this way, the base station apparatus 110 causes the target terminal apparatus to reliably receive the start instruction. Thus, the base station apparatus 110 can reliably remotely start the terminal apparatus to be started.

Example of Magic Packet

Figure 12:
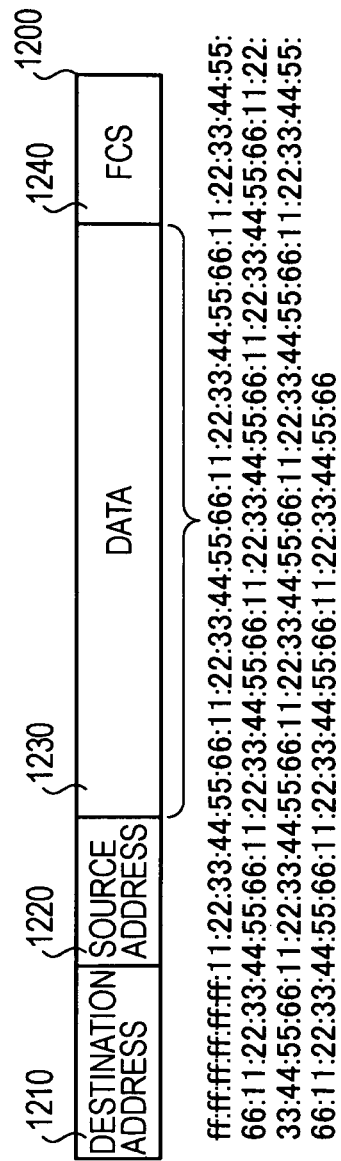
FIG. 12 illustrates an example of a magic packet transmitted from a communication apparatus shown in FIG. 1.

FIG. 12 illustrates an example of a magic packet transmitted from the communication apparatus shown in FIG. 1. For example, the communication apparatus 130 transmits a WOL magic packet 1200 (see FIG. 12) serving as a start request to the base station apparatus 110. The WOL magic packet 1200 contains a destination address 1210, a source address 1220, data 1230, and an FCS (frame check sequence) 1240.

The destination address 1210 is a broadcast address including the destination address of the base station apparatus 110 (e.g., "ff:ff:ff:ff:ff:ff"). The source address 1220 indicates the address of the communication apparatus 130. The data 1230 contains the MAC address of the apparatus to be started. In this example, the MAC address of the target apparatus to be started (e.g., the terminal apparatus 121 or 122) is "11:22:33: 44:55:66".

In this case, in the data 1230, the synchronization sequence "ff:ff:ff:ff:ff:ff" (6 octets) is followed by 16 MAC addresses each being "11:22:33:44:55:66" (6 octets). Accordingly, the number of octets in the WOL magic packet 1200 is at least 6+6×16=102.

When the base station apparatus 110 directly wirelessly distributes, in the form of a start instruction, the WOL magic packet 1200 received from the communication apparatus 130, the WOL magic packet 1200 has an Ethernet (trade name) frame structure.

In such a case, the number of octets contained in the WOL magic packet 1200 to be wirelessly distributed by the base station apparatus 110 is more than or equal to 116 octets. Accordingly, the base station apparatus 110 converts the protocol used for the WOL magic packet 1200 received from the communication apparatus 130 (refer to FIGS. 13 and 14). Thus, the number of octets of the start instruction wirelessly distributed is reduced.

Example of Transmitted and Received Frame

Figure 13:
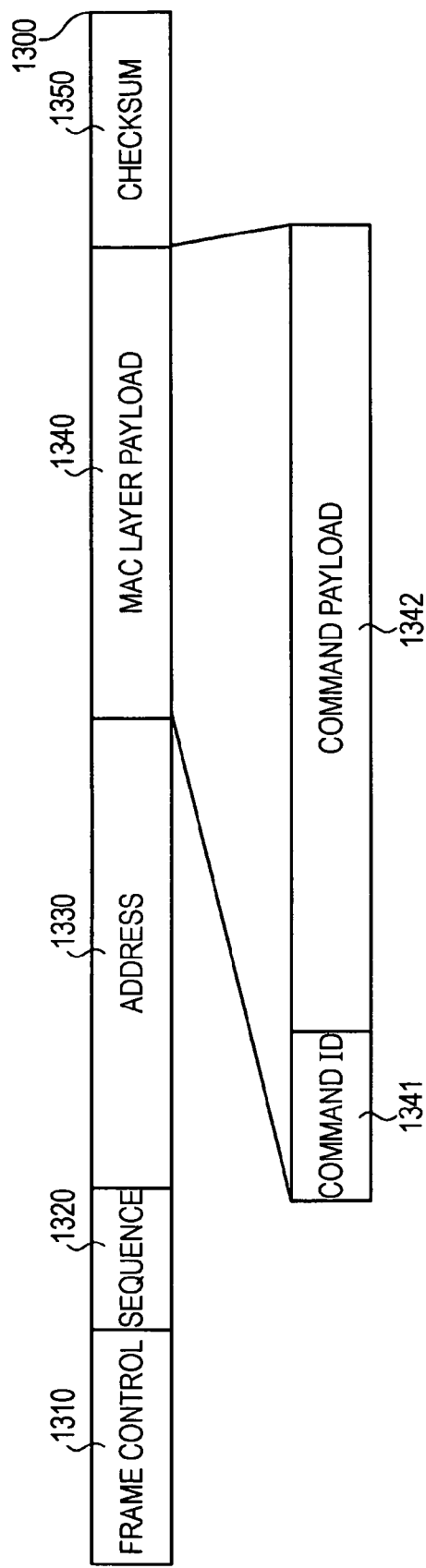
FIG. 13 illustrates an example of a frame communicated between the base station apparatus and the terminal apparatus shown in FIG. 1.

FIG. 13 illustrates an example of a frame communicated between the base station apparatus and the terminal apparatus shown in FIG. 1. Suppose that the terminal apparatus 121 and the terminal apparatus 122 are turned off. At that time, the base station apparatus 110, the terminal apparatus 121, and the terminal apparatus 122 communicate, for example, a MAC layer frame 1300 as shown in FIG. 13 using ultraweak radio waves.

For example, the MAC layer frame 1300 has a frame structure defined by IEEE 802.15.4. More specifically, the MAC layer frame 1300 includes frame control 1310, a sequence 1320, an address 1330, a MAC layer payload 1340, and a checksum 1350.

For example, the size of the frame control 1310 is 2 octets. The size of the sequence 1320 is 1 octet. The size of the address 1330 is 0 to 20 octets. The size of the checksum 1350 is 2 octets. The address 1330 represents the MAC address serving as a destination address to which the MAC layer payload 1340 is delivered.

The MAC layer payload 1340 contains the identification information regarding the terminal apparatus 121 and the terminal apparatus 122 wirelessly transmitted by the terminal apparatus 121 and the terminal apparatus 122, respectively, or a start instruction to be wirelessly distributed by the base station apparatus 110. The MAC layer payload 1340 contains a command ID 1341 and a command payload 1342. The command ID 1341 serves as information indicating the type of command. The command payload 1342 serves as information associated with the command indicated by the command ID 1341.

FIG. 14 illustrates information contained in the MAC layer payload 1340 shown in FIG. 13. As shown in FIG. 14, the value of the command ID 1341 of the MAC layer payload 1340 contained in the MAC layer frame 1300 is one of "0x81", "0x83", and "0x84".

The value "0x81" of the command ID 1341 indicates a command for transmitting a MAC address. Each of the terminal apparatus 121 and the terminal apparatus 122 sets "0x81" in the command ID 1341 and sets the value "6" indicating the payload length and the MAC address thereof in the command payload 1342. Each of the terminal apparatus 121 and the terminal apparatus 122 then transmits the MAC layer frame 1300 serving as the identification information thereof to the base station apparatus 110.

The value "0x83" of the command ID 1341 indicates a start instruction indicating power-on. The base station apparatus 110 sets "0x83" in the command ID 1341 and sets the value "0" indicating the payload length in the command payload 1342. The base station apparatus 110 then wirelessly distributes the MAC layer frame 1300 serving as a start instruction to the terminal apparatus 121 or 122.

The value "0x84" of the command ID 1341 indicates Ack for the start instruction. Upon receiving the start instruction from the base station apparatus 110, each of the terminal apparatus 121 and 122 sets "0x84" in the command ID 1341 and sets the value "0" indicating the payload length in the command payload 1342. Each of the terminal apparatus 121 and 122 then wirelessly transmits the MAC layer frame 1300 to the base station apparatus 110.

In this way, in place of the WOL magic packet 1200 shown in FIG. 12, the distribution unit 116 of the base station apparatus 110 wirelessly distributes, as a start instruction, the MAC layer frame 1300 containing "0x81" in the command ID 1341 and the MAC address of the apparatus to be started. At that time, the number of octets of the MAC layer payload 1340 is slightly less than 20.

Accordingly, the number of octets of the MAC layer frame 1300 is about 30. Consequently, the number of octets of a start instruction wirelessly distributed by the base station apparatus 110 can be significantly reduced, as compared with that in the case in which the WOL magic packet 1200 (more than or equal to 116 octets) is directly wirelessly distributed. As a result, the power consumption of each of the base station apparatus 110, the terminal apparatus 121, and the terminal apparatus 122 can be reduced. In addition, the transmission time of the start instruction can be reduced.

Furthermore, as shown in FIGS. 9 to 11, if a wirelessly distributed start signal is not received by the target terminal to be started (i.e., the terminal apparatus 121 or 122), the distribution unit 116 of the base station apparatus 110 wirelessly redistributes the start signal. Thus, even if the start instruction contains only a single MAC address, the distribution unit 116 can cause the target terminal apparatus to reliably receive the start instruction. As a result, the base station apparatus 110 can reliably remotely start the terminal apparatus to be started.

Still furthermore, unlike the case of a wired WOL in which a magic packet is distributed by broadcasting, even when a start instruction is retransmitted between the base station apparatus 110 and a terminal apparatus, only the wireless communication network 101 is affected. Accordingly, even when a start instruction is retransmitted, the traffic in other networks is not affected.

Example of Table

Figure 15:
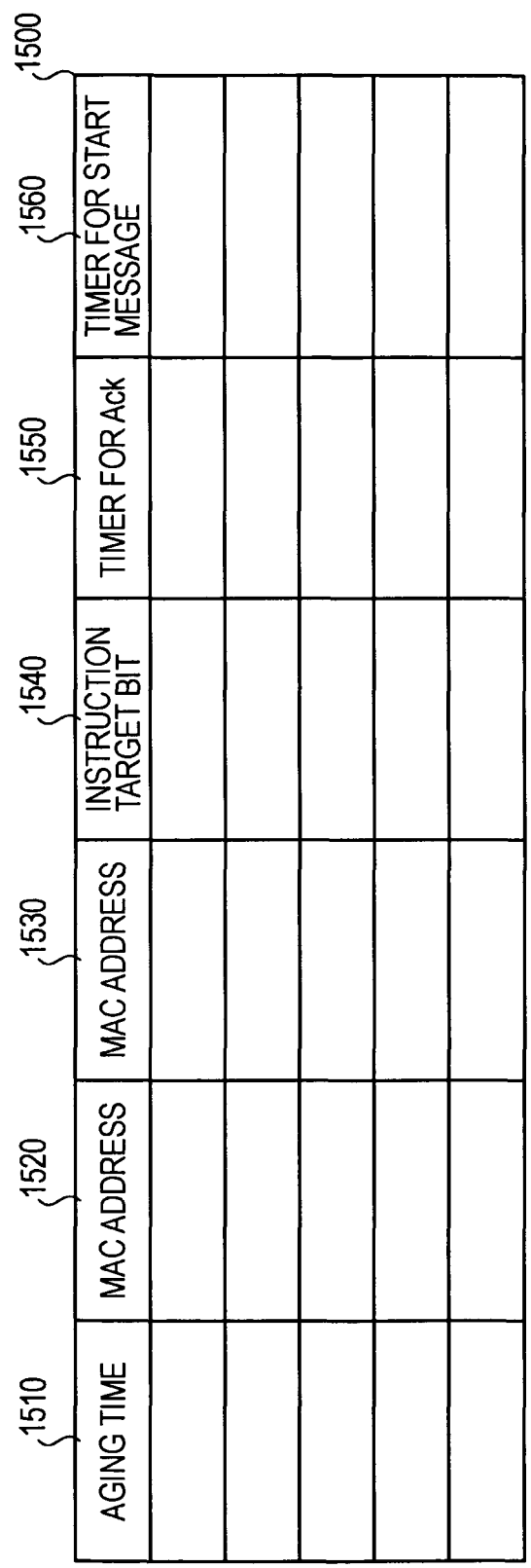
FIG. 15 illustrates an example of a table stored in a storage unit shown in FIG. 1.

FIG. 15 illustrates an example of a table stored in the storage unit shown in FIG. 1. For example, a table 1500 as shown in FIG. 15 is stored in the storage unit 112 shown in FIG. 1. The table 1500 contains the following items: aging time 1510, a MAC address 1520, a MAC address 1530, an instruction target bit 1540, a timer 1550 for Ack, and a timer 1560 for start message.

The aging time 1510 represents, for example, the aging time set by the management unit 113 of the base station apparatus 110 in step S704 shown in FIG. 7. The MAC address 1520 represents, for example, the MAC address received by the wireless receiving unit 111 of the base station apparatus 110 in step S701 shown in FIG. 7.

The MAC address 1520 represents the MAC address of the ultraweak radio wave module of the base station apparatus 110 (e.g., a MAC layer address defined by IEEE 802.15.4). The MAC address 1530 represents, for example, the MAC address of a wireless LAN interface of one of the terminal apparatus 121 and 122. For example, the MAC address 1530 is received in step S701 shown in FIG. 7 together with the MAC address 1520.

For example, in step S902 shown in FIG. 9, the MAC address extracted from the magic packet is searched for in the fields of the MAC address 1530 of the table 1500. In addition, in step S904 shown in FIG. 9, a start instruction containing the MAC address 1520 is wirelessly distributed.

The instruction target bit 1540 indicates a target apparatus to be started by the base station apparatus 110. For example, in step S903 shown in FIG. 9, the instruction target bit 1540 corresponding to the MAC address extracted from the magic packet is set to ON, so that the MAC address extracted from the magic packet is registered as the identification information of the target apparatus to be started. In addition, in step S908 shown in FIG. 9, the instruction target bit 1540 corresponding to the MAC address is set to OFF, so that the MAC address is unregistered.

The timer 1550 for Ack represents, for example, the period of time T4 set when the base station apparatus 110 wirelessly distributes the start instruction in step S904 shown in FIG. 9. For example, the timer 1550 for Ack is set to the system default value 0.544 msec defined by IEEE 802.15.4. When the base station apparatus 110 receives Ack in response to the start instruction wirelessly distributed in step S904, the timer 1550 for Ack is reset.

The timer 1560 for a start message represents, for example, the period of time T5 set when the base station apparatus 110 wirelessly distributes the start instruction in step S904 shown in FIG. 9. For example, the timer 1560 for a start message is set to the system default value or a value specified by a user. When the base station apparatus 110 receives a start message in response to the start instruction wirelessly distributed in step S904, the timer 1560 for a start message is reset.

As described above, according to the above-described base station apparatus, terminal apparatus, and communication method, by receiving identification information wirelessly transmitted from terminal apparatuses located in the vicinity of the base station apparatus and storing the received identification information, the base station apparatus can detect a start request for starting a terminal apparatus that is under the control of the base station apparatus. Accordingly, upon receiving the start request for starting a terminal apparatus that is under the control of the base station apparatus, the base station apparatus wirelessly distributes a start instruction in the vicinity of the base station apparatus. In this way, the base station apparatus can remotely start the terminal apparatus that is under the control of the base station apparatus.

Accordingly, a terminal apparatus in the wireless network can be remotely started. For example, a PC in a wireless LAN can be remotely started. Thus, even in a wireless LAN, PCs that are not in use (e.g., during a night time) are usually turned off, and the PCs can be remotely turned on in order to do maintenance of all of the PCs. As a result, an eco-friendly system and a green ICT can be realized.

In addition, when the base station apparatus receives a start request for starting a terminal apparatus that is not under the control of the base station apparatus, the base station apparatus can discard the start request. Accordingly, a useless start instruction is prevented from being distributed in other wireless networks every time a start request is distributed. Thus, consumption of wasted power and the occurrence of wasted traffic in the other wireless networks can be prevented.

Furthermore, among the stored identification information items, the base station apparatus deletes the identification information item that has not been received again for more than a predetermined period of time. In this way, a base station apparatus need not control a terminal apparatus moved to outside the wireless network and a terminal apparatus having an ultraweak radio wave module that does not operate. Accordingly, the base station apparatus can update the information regarding the terminal apparatuses that are under the control of the base station apparatus at all times.

Still furthermore, if the start instruction wirelessly distributed is not received by the terminal apparatus to be started, the base station apparatus wirelessly redistributes the start instruction. In this way, the base station apparatus can cause the terminal apparatus to be started to reliably receive the start instruction without continuously storing the identification information regarding the terminal apparatus to be started in the start instruction. Accordingly, although the base station apparatus can reliably start the target terminal apparatus to be started, the size of the start instruction can be reduced.

For example, only a single identification information item stored in the start instruction is sufficient. Accordingly, the consumption power required for wireless distribution of a start instruction to the target terminal apparatus can be reduced. In addition, since the size of the start instruction can be reduced, a waiting time of another communication apparatus before the communication apparatus transmits data can be reduced.

Furthermore, wireless receiver for wirelessly receiving the identification information of a terminal apparatus and distribution unit for wirelessly distributing a start instruction are provided separately from a communication interface that communicates with a terminal apparatus when the terminal apparatus is turned on. Thus, the base station apparatus can distribute a start instruction that is dedicated to the base station apparatus and that has a small size.

An ultraweak radio wave module that complies with IEEE 802.15.4 (2.4-GHz band) can be used as each of the wireless receiver for wirelessly receiving the identification information of a terminal apparatus and the distribution unit for wirelessly distributing a start instruction. Originally, the standard for the ultraweak radio wave module is developed for a sensor network. By employing an ultraweak radio wave module in the base station apparatus, a start instruction that is dedicated to the base station apparatus and that has a small size can be distributed.

In addition, a terminal apparatus that wirelessly communicates with the base station apparatus wirelessly transmits the identification information on the terminal apparatus to the base station apparatus. Accordingly, the terminal apparatus can send, to the base station apparatus, a message indicating that the terminal apparatus is located in the vicinity of the base station apparatus. Thus, the terminal apparatus allows the base station apparatus to wirelessly distribute a start instruction when the base station apparatus receives a start request for starting the terminal apparatus.

Furthermore, the wireless transmitter for wirelessly transmitting the identification information regarding the terminal apparatus itself and the receiver for receiving a start instruction are provided separately from a communication interface that communicates with the base station apparatus when the terminal apparatus is turned on. In this way, a start instruction having a dedicated format of a small size can be received without affecting the existing communication interface.

For example, an ultraweak radio wave module that complies with the IEEE 802.15.4 (2.4-GHz band) standard can be used as each of the wireless transmitter for wirelessly transmitting the identification information regarding the terminal apparatus itself and the receiver for receiving a start instruction. By employing an ultraweak radio wave module in the terminal apparatus, the start instruction having the dedicated format of a small size can be received.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the terminal apparatus and base station apparatus, etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A base station apparatus comprising:
a receiver configured to wirelessly receive a media access control (MAC) address of a proximal terminal apparatus located in a vicinity of the base station apparatus, the MAC address being transmitted upon the proximal terminal apparatus being turned off;
a storage configured to store the received MAC address; and
a processor configured to:
receive, from a communication apparatus, a start request containing one or more MAC addresses of one or more stopped terminal apparatuses to be started,
determine whether at least one of the one or more MAC addresses contained in the start request has been stored in the storage,
prepare a start instruction upon the processor determining that at least one of the one or more MAC addresses contained in the start request has been stored in the storage, the start instruction indicating a MAC address that has been stored in the storage and is contained in the start request, and
wirelessly distribute the start instruction to start the proximal terminal apparatus, wherein
when the wirelessly distributed start instruction was not received by the proximal terminal apparatus, the processor wirelessly redistributes the start instruction to the proximal terminal apparatus,
when the processor determines that the MAC address contained in the start request has already been stored in the storage, the storage registers the MAC address of the proximal terminal apparatus, the receiver waits for a success message from the proximal terminal apparatus, in response to the start instruction, the storage unregisters the MAC address of the proximal terminal apparatus after receipt of the success message, and the processor wirelessly redistributes the start instruction when the success message is not received within a predetermined period of time.

2. The base station apparatus according to claim 1, wherein the processor is further configured to delete the MAC address from the storage when the MAC address has not been refreshed after a predetermined period of time.

3. The base station apparatus according to claim 2, wherein the MAC address is refreshed each time the receiver wirelessly receives the MAC address from the proximal terminal apparatus.

4. The base station apparatus according to claim 1, wherein the receiver and the processor are provided separately from a communication interface that communicates with the proximal terminal apparatus when the proximal terminal apparatus is turned on.

5. The base station apparatus according to claim 1, wherein the receiver and the processor operate using at least one of a different radio frequency band and a different communication protocol from a communication interface that communicates with the proximal terminal apparatus when the proximal terminal apparatus is turned on.

6. The base station apparatus according to claim 1, wherein a data size of the start instruction is less than a data size of the start request.

7. The base station apparatus according to claim 1, wherein the start request is in a form repeating each MAC address a plurality of times, and the start instruction is in a form not repeating each MAC address.

8. A terminal apparatus comprising:
a transmitter configured to wirelessly transmit a media access control (MAC) address of the terminal apparatus, the MAC address being transmitted to a base station apparatus upon the terminal apparatus being turned off;
a receiver configured to wirelessly receive a start instruction wirelessly distributed from the base station apparatus, the start instruction indicating the MAC address of the terminal apparatus; and
a processor configured to:
detect, based on the MAC address, that the start instruction received by the receiver matches the terminal apparatus; and
turn on power of the terminal apparatus upon detecting that the start instruction matches the terminal apparatus, wherein
the base station apparatus stores the MAC address received from the terminal apparatus,
the base station apparatus receives a start request containing one or more MAC addresses of one or more stopped terminal apparatuses to be started,
the base station apparatus determines whether at least one of the MAC addresses contained in the start request has already been stored,
the base station apparatus prepares the start instruction upon determining that at least one of the one or more MAC addresses contained in the start request has been stored, the start instruction indicating the MAC address received from the terminal apparatus, which has been stored and is contained in the start request, when the start instruction was not received by the terminal apparatus, the base station apparatus wirelessly redistributes the start instruction to the terminal apparatus, when the base station apparatus determines that the MAC address contained in the start request has already been stored, the base station apparatus registers the MAC address of the terminal apparatus, the base station apparatus waits for a success message from the terminal apparatus, in response to the start instruction, the base station apparatus unregisters the MAC address of the terminal apparatus after receipt of the success message, and the base station apparatus wirelessly redistributes the start instruction when the success message is not received within a predetermined period of time.

9. The terminal apparatus according to claim 8, wherein the transmitter and the receiver are provided separately from a communication interface that communicates with the base station apparatus when the terminal apparatus being turned on.

10. The terminal apparatus according to claim 8, wherein the transmitter and the receiver operate using at least one of a different radio frequency band and a different communication protocol from a communication interface that communicates with the base station apparatus when the terminal apparatus is turned on.

11. A communication system comprising:
a base station apparatus; and
a proximal terminal apparatus located within a vicinity of the base station apparatus, the proximal terminal apparatus comprising:
a transmitter configured to wirelessly transmit a media access control (MAC) address of the proximal terminal apparatus, the MAC address being transmitted to the base station apparatus upon the proximal terminal apparatus being turned off;
a receiver configured to wirelessly receive a start instruction wirelessly distributed from the base station apparatus, the start instruction indicating the MAC address of the proximal terminal apparatus; and
a processor configured to:
detect, based on the MAC address, that the start instruction received by the receiver matches the proximal terminal apparatus; and
turn on power of the proximal terminal apparatus upon detecting that the start instruction matches the proximal terminal apparatus, wherein
the base station apparatus comprises:
a receiver configured to wirelessly receive the MAC address from the proximal terminal apparatus;
a storage configured to store the MAC address; and
a processor configured to:
receive, from a communication apparatus, a start request containing one or more MAC addresses of one or more stopped terminal apparatuses to be started;
determine whether at least one of the MAC addresses contained in the start request has been stored in the storage;
prepare a start instruction upon the processor determining that at least one of the one or more MAC addresses contained in the start request has been stored in the storage, the start instruction indicating a MAC address that has been stored in the storage and is contained in the start request; and wirelessly distribute the start instruction to start the proximal terminal apparatus, when the wirelessly distributed start instruction was not received by the proximal terminal apparatus, the base station apparatus wirelessly redistributes the start instruction to the proximal terminal apparatus, when the base station apparatus determines that the MAC address contained in the start request has already been stored in the storage, the storage registers the MAC address of the proximal terminal apparatus, the base station apparatus waits for a success message from the proximal terminal apparatus, in response to the start instruction, the storage unregisters the MAC address of the proximal terminal apparatus after receipt of the success message, and the base station apparatus wirelessly redistributes the start instruction when the success message is not received within a predetermined period of time.

12. A communication method for use in a base station apparatus, comprising:

wirelessly receiving a media access control (MAC) address of a proximal terminal apparatus that is located in a vicinity of the base station apparatus, the MAC address being transmitted upon the proximal terminal apparatus being turned off;

storing the received MAC address in a storage;

receiving, from a communication apparatus, a start request containing one or more MAC addresses of one or more stopped terminal apparatuses to be started;

determining whether at least one of the one or more MAC addresses contained in the start request has already been stored in the storage;

preparing a start instruction upon determining that at least one of the one or more MAC addresses contained in the start request has been stored in the storage, the start instruction indicating the MAC address received from the proximal terminal apparatus, which has been stored in the storage and is contained in the start request; and wirelessly distributing the start instruction to start the proximal terminal apparatus, wherein when the wirelessly distributed start instruction was not received by the proximal terminal apparatus, the base station apparatus wirelessly redistributes the start instruction to the proximal terminal apparatus, when the base station apparatus determines that the MAC address contained in the start request has already been stored in the storage, the storage registers the MAC address of the proximal terminal apparatus, the base station apparatus waits for a success message from the proximal terminal apparatus, in response to the start instruction, the storage unregisters the MAC address of the proximal terminal apparatus after receipt of the success message, and the base station apparatus wirelessly redistributes the start instruction when the success message is not received within a predetermined period of time.

13. A communication method for use in a terminal apparatus, comprising:

wirelessly transmitting a media access control (MAC) address of the terminal apparatus, the MAC address being transmitted to a base station apparatus upon the terminal apparatus being turned off;

wirelessly receiving a start instruction wirelessly distributed from the base station apparatus, the start instruction indicating the MAC address of the terminal apparatus;

detecting, based on the MAC address, that the start instruction is intended to start the terminal apparatus; and turning on power of the terminal apparatus upon detecting that the start instruction is intended to start the terminal apparatus, wherein the base station apparatus stores the MAC address received from the terminal apparatus, the base station apparatus receives a start request containing one or more MAC addresses of one or more stopped terminal apparatuses to be started, the base station apparatus determines whether at least one of the MAC addresses contained in the start request has already been stored, and the base station apparatus prepares the start instruction upon determining that at least one of the one or more MAC addresses contained in the start request has already been stored, the start instruction indicating the MAC address received from the terminal apparatus, which has been stored and is contained in the start request, wherein when the wirelessly distributed start instruction was not received by the terminal apparatus, the base station apparatus wirelessly redistributes the start instruction to the terminal apparatus, when the base station apparatus determines that the MAC address contained in the start request has already been stored, the base station apparatus registers the MAC address of the terminal apparatus, the base station apparatus waits for a success message from the terminal apparatus, in response to the start instruction, the base station apparatus unregisters the MAC address of the terminal apparatus after receipt of the success message, and the base station apparatus wirelessly redistributes the start instruction when the success message is not received within a predetermined period of time.

* * * * *